United States Patent [19]
Sato

[11] 3,786,543
[45] Jan. 22, 1974

[54] METHOD OF PRODUCING ROTATING JOINT MEMBER BY CASTING

[75] Inventor: Shigeru Sato, Yokohama, Japan

[73] Assignees: Nippon Miniature Bearing Co. Ltd., Nagano; Tanaka Diecast Co. Ltd., Yokohama, Japan

[22] Filed: Apr. 26, 1972

[21] Appl. No.: 247,712

[52] U.S. Cl.............. 29/149.5 B, 29/424, 29/441
[51] Int. Cl...................... B23p 11/00, B23p 17/00
[58] Field of Search........ 29/149.5 B, 424, 441, 423

[56] References Cited
UNITED STATES PATENTS
2,252,351  8/1941  Paulus............................ 29/149.5 B
2,462,138  2/1949  Spangenberg.................. 29/149.5 B Primary Examiner—Thomas H. Eager
Attorney, Agent, or Firm—Ernest A. Greenside et al.

[57] ABSTRACT

A spherical element whose external peripheral surface is coated with a thin heat resisting resin film and said spherical element is set into the inside of a metal mold provided with a molding chamber for casting a socket for embracing the spherical element, and then a molten metal is poured into the metal mold for forming the socket and is solidified to cast the socket that embraces the spherical element and this cast socket is removed from the metal mold and the heat resisting resin film remaining on the external peripheral surface of the spherical element is removed mechanically or chemically thereby forming a clearance that permits the free rotation of the spherical element with respect to the socket in the external peripheral surface of the spherical element and the inner surface of the socket.

5 Claims, 8 Drawing Figures

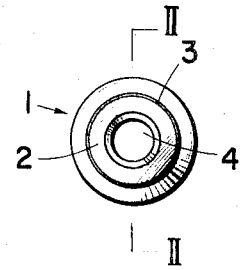
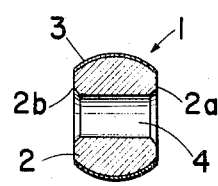
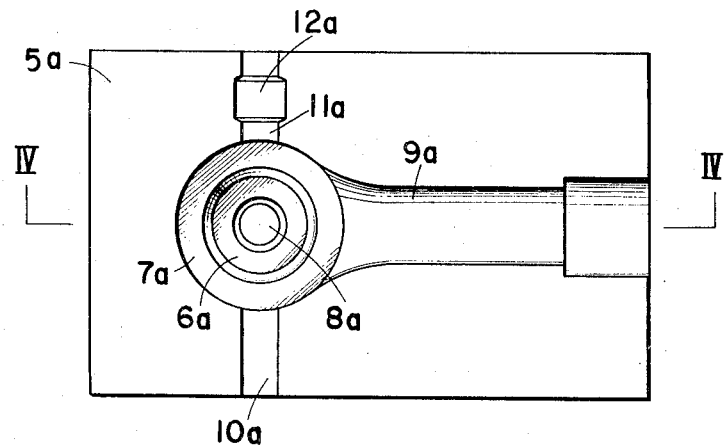
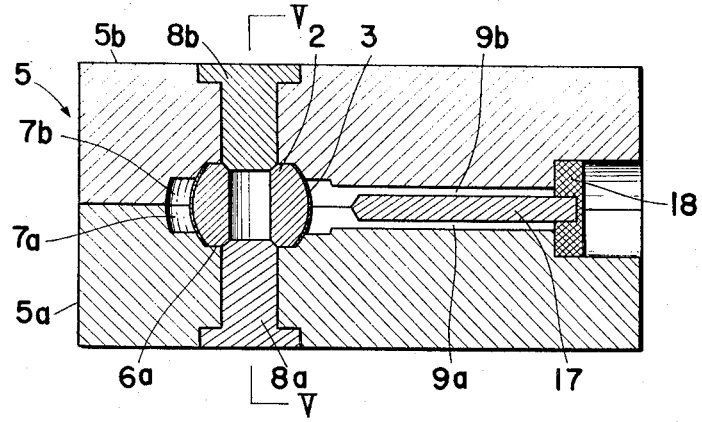

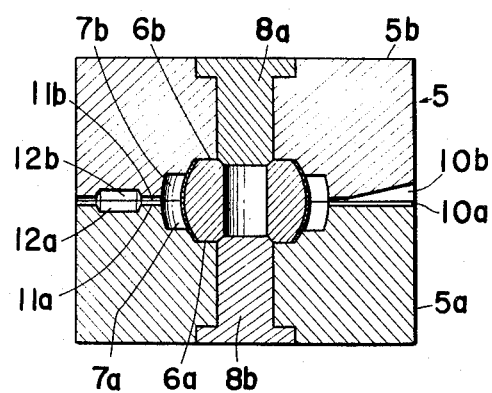
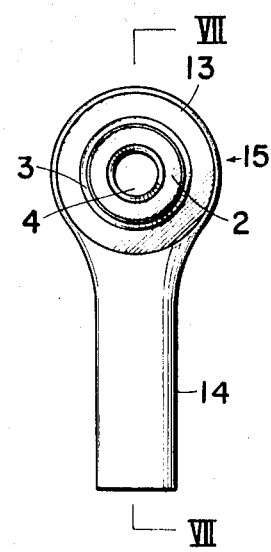
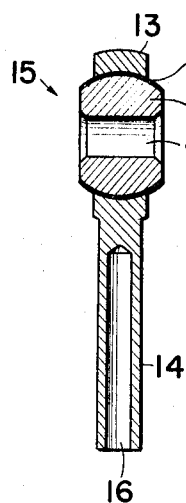
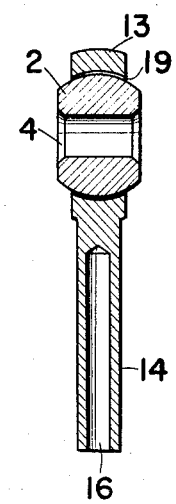

METHOD OF PRODUCING ROTATING JOINT MEMBER BY CASTING

The present invention relates to a method of making a rotatable joint member and more particularly to a method utilizing casting techniques Rotatable joint members which may be made by the method of the application comprise, for example rod end bearings, ball joints or castors and like structures provided with a spherical member and a socket for rotatably embracing the spherical member.

The manufacture of rotatable joint members of the kind described has heretofore been made in such manner that the spherical member and the socket are separately prepared and after the spherical member is fitted into the socket, the socket is conditioned as by caulking or swaging to retain the spherical member for rotation therein. Such method however has drawbacks, notably the need for manifold steps in making the rotatable joint member and undesirable loss of material due to the physical machining of the socket from a blank.

One object of the present invention is to provide a simple method of making the rotatable joint member by casting techniques to obviate the need for machining the socket the socket.

Another object of the present invention is to provide a rotatable joint member which is inexpensive to manufacture.

A further object of the present invention is to provide a rotatable joint member, which is produced in such manner prior to casting, a thin heat resisting resin film is coated on the outer rotating surface of a preformed spherical element whereafter the socket portion is provided by casting metal around the spherical member provided with the thin heat resisting resin film, whereafter the heat resisting resin film is removed by mechanical or chemical means to provide a clearance between the inner surface of the socket and the rotating surface of the spherical element, so that the spherical element may be capable of freely rotating with respect to the socket.

The present invention will be explained in the following with respect to the method of making the rod end bearing by referring to the drawings wherein, FIG. 1 is an elevational view of the spherical member, which is prepared before the casting;

FIG. 2 is a vertical cross sectional side view of the spherical member, taken along a line II — II of the FIG. 1;

FIG. 3 is a plan view of a lower member of the mold assembly of the type consisting of a lower and a upper members;

FIG. 4 is a vertical cross sectional view of the mold assembly into which the spherical member is set;

FIG. 5 is a vertical cross sectional view of the mold assembly, taken along a line V — V of the FIG. 4;

FIG. 6 is an elevational view of the rod end bearing removed from the mold assembly after the casting;

FIG. 7 is a vertical cross sectional view of the rod end bearing, taken along a line VII—VII of the FIG. 6 and FIG. 8 is a vertical cross sectional view of the completed rod end bearing from which the heat resisting resin film is removed.

In the FIGS. 1 and 2, reference numeral 1 designates generally a preformed spherical member to serve as a rod end bearing. This spherical member has a flat front surface 2a and a flat rear surface 2b, a heat resisting resin film 3 being formed on spherical outer surface of spherical element 2. Opening 4 is bored through the spherical element so as to extend from its front portion to its rear side. The resin film 3 may be formed of a material, for example, polytetrafluoroethylene resin, and its thickness may be set in the range from two microns to ten microns.

The spherical member 1 is set into the lower mold 5a, as shown in FIG. 3. The lower mold 5a is formed with a concave portion 6a on its upper surface for receiving the flat surfaces 2a, 2b of the spherical member 1, and a larger diametral concave portion 7a, comprising a molding chamber for forming the socket is formed about the smaller concave portion 6a, said molding portion 7a being formed slightly shallower than the concave portion 6a. The lower mold 5a is constructed in such manner to receive pin 8a, extending into the concave portion 6a for supporting therewith the spherical member 1 in centered position in the concave portion 6a occasioned by pin 8a partially entering the opening 4 as shown in FIG. 4. The mold is also formed with a concave portion 9a for forming a shank portion of the socket in the rod end bearing, concave portion 9a being formed as an extension of the molding portion 7a. The lower mold also has a groove 10a serving as a sprue runner to supply molten metal into the molding chambers 7a and 9a, a groove 11a to permit relief of excess molten metal into the molding chamber 7a and a runner pool 12a.

After the spherical member 1 is set into the lower mold 5a, the upper mold 5b is mounted on the lower mold 5a. The upper mold 5b is formed with concave portions 6b, 7b, 9b, 10b, 11b and 12b which corresponds to each of the concave portions 6a, 7a, 9a, 10a, 11a and 12a of the lower mold 5a. The upper mold 5b is also provided with a centering pin 8b serving the same function as pin 8a.

Detailed description of actual use of the mold assembly specified above will now be made with respect to the method according to the present invention.

The molten metal is poured via the sprue runner formed by the grooves 10a, 10b into the molding chamber for forming the socket in the concave portions 7a, 7b of the metal mold 5, said molten metal being supplied in sufficient quantity to also fill concave portions 9a, 9b wherein the shank portion is formed. The molten metal in the respective molding chambers is then solidified.

Thus, the rod end bearing 15, as shown in FIGS. 6 and 7, is cast in which the spherical member 1 is embraced by the socket 13 having the shank 14. The resulting is removed from the lower mold 5a of the metal mold after removal of the upper mold 5b.

The rod end bearing which has been cast in the manner described retains the heat resisting resin film 3 coating between the external periphery of the spherical element 2 and the inner surface of the socket 13. Such heat resisting resin film 3 may be removed, for example, by forcibly rotating the spherical element 2 in the socket by, for example, inserting a shaft in the axial opening 4 of the spherical element 2. A clearance 19 is formed on removal of the coating that permits the free rotation of the spherical element 2 in the socket 13, the clearance being between the external peripheral surface of the spherical element 2 and the inner surface of the socket 13.

The removal of the heat resisting resin film may optionally be carried out either by chemical or by mechanical means referred to above.

The shank 14 may be formed with a threaded hole 16 for connecting the same to other means. In such case, a core with an external thread 17 and a plug 18 may be disposed in the molding chamber defined by concave portions 9a, 9b. The shank thus formed will be internally threaded.

As will be obvious from the foregoing description, a rod end bearing with clearance that permits the free rotation of the spherical element between the inner surface of the socket and the external periphery of the spherical element may be obtained by utilizing casting techniques.

It should specifically be noted that the provision at a heat resisting resin film 3 the external peripheral surface of a preformed spherical element 2, permits the manufacture of a rod end bearing structure by casting which, heretofroe has been impossible to achieve.

While the form of embodiment of the present invention as herein disclosed constitutes a preferred form, it is to be understood that other forms might be adopted, all coming within the scope of the claims which follow:

What is claimed is:

1. A method of producing a rotatable joint member by casting, characterized by setting a preformed spherical element with a heat resistant resin film about its external peripheral surface into a metal mold provided with a molding chamber for forming a socket embracing the spherical element, thereafter pouring a molten metal into the molding chamber for forming the socket of the rotatable joint member, solidifying the poured metal to form a cast socket that embraces the spherical element, removing the cast socket from the metal mold, and removing the heat resistant resin film remaining between the external periphery of the spherical element and the inner surface of the socket to form a clearance permitting free rotation of the spherical element relative to the cast socket.

2. A method of producing a rotatable joint member as defined in claim 1, wherein the heat resisting resin film remaining on the external periphery of the spherical element after the casting is removed by the forced rotation of the spherical element in the cast socket.

3. A method of producing a rotatable joint member as defined in the claim 1, wherein the heat resisting resin film of the spherical element is formed of polytetrafluoroethylene resin.

4. A method of producing a rotatable joint member as defined in claim 1, wherein the heat resistant resin film comprises a coating of a thickness in the range from two microns to ten microns.

5. A method of producing a rotatable joint member by casting, characterized by setting a preformed spherical element with a heat resistant resin flim about its external peripheral surface into a metal mold provided with a molding chamber for forming a socket embracing the spherical element, thereafter pouring a molten metal into the molding chamber for forming the socket of the rotatable joint member, solidifying the poured metal to form a cast socket that embraces the spherical element, removing the cast socket from the metal mold, and removing the heat resisting resin film of polytetrafluorethylene resin remaining between the external periphery of the spherical element and the inner surface of the socket to form a clearance permitting free rotation of the spherical element relative to the cast socket.

* * * * *